United States Patent [19]
Hartemink
[11] Patent Number: 4,519,246
[45] Date of Patent: May 28, 1985

[54] IMPROVED FLOW METER

[75] Inventor: Gerrit A. Hartemink, Harderwijk, Netherlands

[73] Assignee: Advanced Semiconductor Materials International, N.V., Bilthoven, Netherlands

[21] Appl. No.: 332,557

[22] Filed: Dec. 21, 1981

[51] Int. Cl.[3] .............. G01F 1/68
[52] U.S. Cl. .............. 73/204
[58] Field of Search .............. 73/204, 202; 285/47; 138/149, 129, 177, 150, 154, 131; 252/62; 106/90

[56] References Cited

U.S. PATENT DOCUMENTS

| | | | |
|---|---|---|---|
| 1,281,051 | 10/1918 | Mispel | 73/204 |
| 2,813,237 | 11/1957 | Fluegel et al. | 73/204 |
| 3,014,872 | 12/1961 | Scott | 252/62 |
| 3,312,250 | 4/1967 | Siriqnano et al. | 138/129 |
| 3,635,256 | 1/1972 | McLarty | 138/144 |
| 3,938,384 | 2/1976 | Blair | 73/204 |
| 4,013,102 | 3/1977 | De Lorean et al. | 138/132 |
| 4,214,612 | 7/1980 | de Putten | 138/129 |
| 4,246,057 | 1/1981 | Janowski et al. | 138/149 |
| 4,295,669 | 10/1981 | LaPrade et al. | 285/47 |
| 4,371,197 | 2/1983 | Chabrier | 285/47 |
| 4,393,901 | 7/1983 | Beck | 138/177 |

FOREIGN PATENT DOCUMENTS

| | | | |
|---|---|---|---|
| 1396324 | 3/1965 | France | 73/204 |
| 56-81421 | 7/1981 | Japan | 73/204 |
| 104663 | 6/1942 | Sweden | 73/204 |
| 617942 | 2/1949 | United Kingdom | 73/202 |

*Primary Examiner*—Steven L. Stephan
*Assistant Examiner*—David R. Schuster
*Attorney, Agent, or Firm*—Weiss & Holloway

[57] ABSTRACT

An improved mass flow meter is disclosed for measuring the flow rate of a fluid through a thin walled sensor tube that has the feature of high sensitivity to the temperature of the fluid within the sensor tube. The sensor tube is wound with closely coupled resistance elements of insulated wire. Measurement is accomplished with a conventional bridge connection to the sensor resistance elements. The bridge is designed to remain in balance over a wide range of ambient temperature at a zero flow rate. Fluid flow through the sensor tube upsets the uniform temperature gradient with heat loss being greater upstream so that the balance of the sensor resistance elements installed or coupled to the sensor tube (which elements are heated by a power supply) is progressively upset with increasing flow. External heat loss is reduced (thereby providing greater temperature sensing ability) by surrounding the sensor tube with a polyester fiber insulating material covered with a metallic heat shield and by connecting the flow meter into the fluid stream through thermal insulating couplings.

17 Claims, 2 Drawing Figures

IMPROVED FLOW METER

BACKGROUND OF THE INVENTION

1. Field of the Invention

This invention relates generally to flow meters and, more particularly, to flow meters containing improved insulating materials and thermal shields which are useful in the sensitive measurement of the mass flow of a fluid which can be either a gas or a liquid.

2. Description of the Prior Art

In the past, mass flow meters have been developed and manufactured by various companies for the purpose of carefully measuring or sensing fluid flow. Many applications have been developed for the use of mass flow meters such as in deposition equipment to carefully control fluids, usually gases, for the formation of deposited layers on objects like semiconductor wafers in order to assist in the fabrication of semiconductor chips containing thousands of semiconductor devices and, in some cases, thousands of integrated circuits.

Thus, in fabricating, for example, semiconductor chips having thousands or tens of thousands of integrated circuits contained in each of the chips, it became much more difficult to control and increase the yields in making good chips. As the chips became more complex and packed with more devices and increased amounts of integrated circuits, the yield problems associated with producing good chips became greater and greater. As the technology has been increased towards making chips having more than a million integrated circuits such as million plus bit random access MOS type memory chips, the necessity of more precisely controlling all the different phases of chip manufacture became extremely important. Accordingly, a need existed to provide very sensitive and accurate mass flow devices to more carefully control the fluids used in the semiconductor fabrication process and thereby increase yields in making good semiconductor chips. Deposition materials such as polysilicon, which in many applications has to be carefully doped with certain impurities to provide a desired electrical resistance or conductivity, are often needed to manufacture complex semiconductor chips having large numbers of integrated circuits. Therefore, the importance of very accurate and sensitive flow meters to carefully control the thickness of the depositions and the mixing of impurities or materials to obtain certain desired electrical characteristics continues to become more evident as chips containing integrated circuits increase in circuit density.

SUMMARY OF THE INVENTION

It is therefore an object of the present invention to provide an improved flow meter.

It is another object of this invention to provide an improved flow meter which can be easily sized to accommodate various flow rates that may be required in different applications.

It is still another object of the invention to provide an improved flow that is relatively uninfluenced by changes in the ambient temperature.

It is a further object of the invention to provide an improved flow meter having a resistance wire of an iron nickel alloy for the sensing elements of the flow meter, the wire being provided with an electrical insulation layer.

It is still another object of the invention to provide an improved flow meter design which features two sensing coils made of the aforementioned resistance wire, wound adjacent to each other around a thin walled tube through which the fluid flow to be measured flows. The sensing coils are in good thermal contact with the tube to avoid thermal lag. Good thermal contact is achieved by coating the insulated coils, after being wound on the tube, with a thin layer of thermal conducting compound which also penetrates the spaces between the windings and coats or contacts the tube before the compound starts curing to cement the coils firmly in place around the tube.

It is a still further object of the invention to provide an improved flow meter having non-metallic couplings installed at the upstream and downstream end of the sensor tube of the flow meter to thermally isolate the flow meter sensor tube from the connecting tubings.

It is an object of the invention to provide an improved flow meter wherein the sensor tube and associated resistor elements of the flow meter are enclosed in a non-woven polyester fiber insulating material containing an admixture of plastic microspheres which material greatly reduces undesired sensor tube heat loss from convection and radiation effects.

It is also an object of the invention to provide a flow meter wherein isothermal conditions are created at the outer periphery of the aforementioned polyester fiber insulating material by placing a metallic shield around this insulating material which shield has a high thermal conductivity and a sufficiently large heat capacity.

It is still another object of the invention to provide an improved flow meter having a combination of the above described features to provide increased accuracy and sensitivity of the flow meter operation.

Still another objects, features and advantages of the present invention will become apparent to those skilled in the art from a reading of the following description of the preferred embodiment, taken in conjunction with the accompanying drawings.

BRIEF DESCRIPTION OF THE PREFERRED EMBODIMENT

In accordance with one embodiment of this invention, there is provided an improved flow meter comprising, in combination, sensor tube means for permitting flow of a fluid to be measured to be passed therethrough; fluid flow sensing means having electrical sensing resistance means coupled to said sensor tube means for determining the fluid flow characteristics of a fluid flowing through said sensor tube means, and non-woven, polyester fiber insulation material means located around said sensor tube means and said electrical sensing resistance means for significantly reducing external thermal heat loss and for increasing the sensitivity of said electrical sensing resistance means, and metallic shield means located around said insulating means for the creation of an isothermal environment at the outside surface of said insulation means.

THE SPECIFICATION

Flow meters generally measure the fluid through a conduit or tube by using the technique of measuring the difference in the senor tube temperature before and after applying a known amount of heat thereto since the flow quantity and speed of flow is proportional to the temperature difference that is measured at two spaced apart positions at the outside portion of the conduit or tube. An example of one flow meter in the prior art is U.S. Pat. No. 3,938,384 where open cell foam material is used to encase the sensor temperature sensitive resistive wire coils. However, the open cell foam material is the type of material that does not have a great deal of strength which is especially important in holding the sensor elements in contact with the outer portion of the conduit or tube to obtain increased sensitivity in sensing. Thus, a need existed to provide a stronger insulating material that could achieve the goal of providing temperature insulation for the sensor elements to prevent undesired ambient temperature effects on the sensor operation and to also prevent convection of air around the sensor arrangement which would cause attitude sensitivity while, yet, having strong lightweight and flexural qualities to hold the sensor elements in close contact with the conduit or tube.

Figure 1:
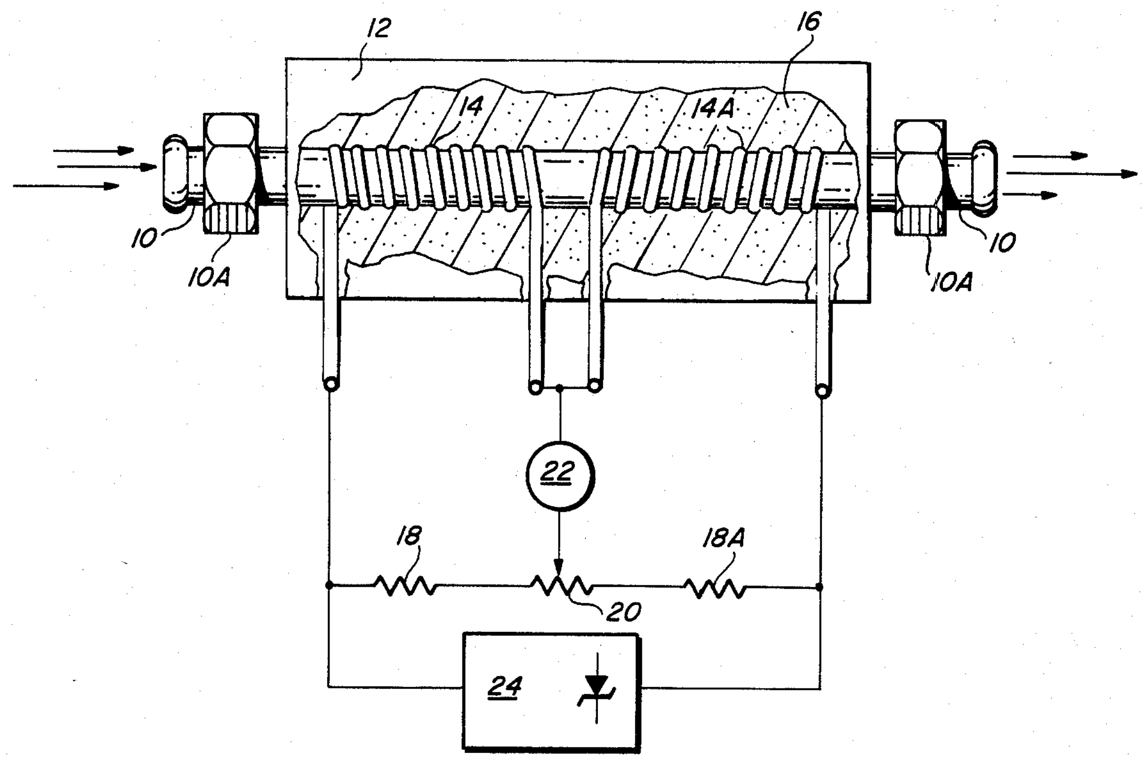
FIG. 1 is an enlarged view showing the sensor tube portion of the improved flow meter of this invention with the isothermal metallic shield and insulation cut away showing the wire resistance elements and further including an electrical schematic of the external electrical components used for sensing and their connections.

Referring to FIG. 1 an enlarged view of the sensor tube portion shows salient features of the flow meter embodiment of this invention. Fluid flow to be measured flows through sensor tube 10 in the direction of the arrow. The sensor tube 10 should preferably be fabricated of low carbon, seamless, stainless steel tubing with a wall thickness of preferably 0.002 to 0.003 inches in order to provide increased sensitivity for sensing the temperature of the fluid within the sensor tube. Other metals may be used if reactivity with the measured fluid so dictates. Internally threaded, compression nuts 10A located at the input and output portions of the sensor tube 10 should be preferably made of metal even though the isolation nipples (see 10B in FIG. 2) are preferably made of Viton plastic. Compression rings at the ends of the sensor tube 10 should be brazed or silver soldered in place, although a standard formed flare type compression joint may also be used, if desired.

The sensor resistance windings or elements 14 or 14A are extremely sensitive to temperature, so when heated up by dissipation caused by an electrical current, their resistance value is determined by their own temperature and also by the temperature changes caused by the fluid within the sensor tube which carries heat from the inner side of the tube. They are dimensioned to match the sensor tube size and the heat transfer and temperature-distribution configuration is in accordance with the flow rate of the flow through the flowmeter. For use on the sensor tube 10 of the embodiment disclosed herein, primarily iron alloy, insulated wires, such as 70% Fe 30% Ni available in diameters of about 0.0008 inches (0.8 mil) have been found very sensitive to sensing the temperature of the flow through the sensor tube 10. Also, similarly dimensioned noble metal alloy insulated resistance wires can be used as the sensor elements 14 and 14A.

External radiation and convection from the heated sensor resistance windings or elements 14 and 14A are reduced by an improved insulating material 16 which is preferably composed of a proprietary, non-woven, polyester fiber product with plastic microspheres commercially available under the trademark COREMAT from FIRET which is a corporation of the Netherlands. This insulation material used in this particular application has a number of significant technical advantages which includes providing excellent thermal isolation from the surrounding temperature ambient and between each sensor resistance winding, strength and flexural support for each sensor resistance winding to permit and maintain good sensing contact between the resistance windings and the sensor tube 10, and low thermal conductivity through the insulation material 16 even though the insulating material 16 is very light in weight. The insulating material 16 can be, if desired, wrapped around the sensor elements 14 and 14A by using, for example, a tape of the insulating material having a width of, for example, 5 mms and a thickness of 1 mm. The insulation 16 arranged around the sensor tube 10 is preferably not resin impregnated.

A thermal shield 12 consisting of a metal plate formed concentrically around the insulated covering on the flow sensor and in intimate contact therewith provides an effective means to keep the outer surface of the insulating material at an isothermal homogeneous temperature condition. Therefore, external temperature disturbances caused by radiation or conduction which would affect the temperature of the sensor arrangement in a non-symmetrical way, thereby causing a disturbance on the effect to be measured, are avoided. The metallic shield 12 should be constructed of copper or aluminum to provide high thermal conductivity and an approximate homogeneous temperature distribution although it may have a non-symmetrical response to radiant or conductive heat influx.

The following theoretical discussion is included in the specification to best illustrate the need for the disclosed metallic heat shield, the need for a stable covering of polyester insulation, the need for mechanically anchored sensing resistance windings and the need for a closely regulated constant current power supply. Assume a concentric arrangement of a sensor tube assembly (tube plus coils), insulating material and heat shield, approximately as shown in FIG. 1.

By definition $$\tau_1 = A/(B + C \cdot \text{Flowrate})$$

$$\tau_2 = A/D$$

both equations are time related

Where,

A = a constant based on reflecting tube geometry and thermal characteristics of the tube;

B = a constant based on the insulating material geometry and its influence on thermal conductivity;

C = a parameter related to the specific heat of fluid in the sensor tube and its influence on the temperature profile;

D = a parameter reflecting dissipated heat density

For the below equations

Tw = characteristic constant of the sensor element wire;

Tamb = temperature at the outer surface of the insulating material;

t = time;

$\overline{T}$.s.w. (t)=sensor winding (average temperature as a function of time).

The two sensor coils are treated in the following equations as independent heat dissipating elements and conduction of the sensor tube is neglected:

$$\overline{T.s.w.}\ (t) = \left( Tamb \frac{\tau_2}{\tau_2 - \tau_1} + Tw \frac{\tau_1}{\tau_2 - \tau_1} \right) \cdot \left( 1 - e^{-t\frac{\tau_2-\tau_1}{\tau_1\tau_2}} \right) + Tamb\, e^{-t\frac{\tau_2-\tau_1}{\tau_1\tau_2}}$$

It can be seen from the above expression that after switching current on in the sensor coils at t=0, $\overline{T}$.s.w. (t=0)=Tamb, an extended time after switching the current on, the expression becomes:

$$\overline{T.s.w.}\ (t\rightarrow\infty) = Tamb. \frac{\tau_2}{\tau_2 - \tau_1} + T_w \frac{\tau_1}{\tau_2 - \tau_1}$$

In the above expression, all the relevant physical parameters are presented. Their influence on the average sensor coil temperature can be calculated by taking the derivative of $\overline{T}$.s.w. for the parameter of interest.

The general expression is:

$$d\overline{T.s.w.} = Tamb\left( \frac{1}{\tau_2 - \tau_1} \frac{d\tau_2}{da} - \frac{\tau_2}{(\tau_2 - \tau_1)^2} \frac{d(\tau_2 - \tau_1)}{da} \right) + Tw\left( \frac{1}{\tau_2 - \tau_1} \frac{d\tau_1}{da} - \frac{\tau_1}{(\tau_2 - \tau_1)^2} \frac{d(\tau_2 - \tau_1)}{da} \right)$$

The following conclusions can be drawn:

1. The influence of power supply current variation: at a nominal current of 15 ma is 25 deg C./ma. Thus, a change in current of 1.0 ma causes a change in average coil temperature of 25° C.

2. The influence of the position of the insulating material around the sensor tube is about 40° C./mm. So displacement of the insulating material of approximately 100 um will cause a coil temperature change of about 4 degrees C.

3. Response to fluid flow through the sensor tube (the effect to be measured) can be calculated by taking $$\frac{d(\overline{T.s.w.}\text{ (For Coil \#1)} - \overline{T.s.w.}\text{ (For Coil \#2)})}{d\text{ flow}}$$

which gives 2° C./ccm/sec flow. The maximum flow to be measured is about 5 ccms/sec so the total effect is approximately a 10° C. temperature difference between the two coils. Thus, if an output signal drift of 0.5% of full scale can be tolerated (which is 0.05° C.), a current drift of 2 uamp is tolerable. A shift of the insulating material position of 1 um is also the maximum tolerable. Thus, the necessity for a constant current power supply and a very rigid mechanical construction becomes important.

4. As a first order approximation, the average sensor winding temperature is proportional to the ambient temperature, so the temperature difference between the outside surfaces of the insulating material located around sensor coil number 1 and sensor coil number 2 that can be tolerated is in the order of magnitude of 0.05° C., which is achieved as disclosed herein by placing a good conducting thermal shield around the outside perimeter of the insulating material (see insulation material 16 surrounded by shield 12 in FIG. 1).

The upstream end of the sensor resistance winding 14 is connected to one end of bridge resistor 18 and to one output terminal of regulated and temperature compensated power supply 24. The other end of the sensor resistance winding 14 is electricity connected to one end of the sensor resistance winding 14A. Thus, the connected ends of the sensor resistance elements 14 and 14A are brought out to an external center tap which is connected to one side of a balance indicator 22 (which can be, for example, a sensitive galvanometer.

The far end of (downstream) sensor resistance winding 14A is connected to one end of bridge resistor 18A and to the other output terminal of power supply 24 (which is preferably a zener controlled power supply). The inner end portions of the bridge resistors 18 and 18A are connected to a comparatively low value variable resistor 20, the center tap of which is connected to the other side of the balance indicator 22.

The bridge resistors 18 and 18A should preferably be equal in value and be preferably about 50 times the value of the sensor resistors 14 and 14A and should also preferably be wire wound instrument grade resistors with a very low temperature coefficient. The balancing resistor 20 should preferably have a value of about two percent of the resistors 18 and 18A to serve the purpose of equalizing small manufacturing differences in resistors 14 and 14A and in setting the offset of the balance indicator or detector device 22 so that the flow range through the sensor tube 10 will deviate from a pre-set positive or negative value to a desired negative or positive value at the flow rate selected. Direction of signal movement and readout polarity will depend on the polarity of the connections of the power supply 24 and the polarity of the connections to the detector 22. A DC Op amp with isolated inputs can also be used as the detector 22 to drive a meter scaled in flow rates. Additional amplifiers can also be used to drive process control equipment related to fluid flow. A well-known feature of bridge connections is the fact that at balance, the detector, battery or power supply can be interchanged in the circuit without upsetting the balance. One possible bridge connection is an arrangement in which all four resistance arms are approximately equal. The disadvantage of such an arrangement is that the two bridge resistors dissipate approximately the same amount of heat as the sensor windings which is not the most desirable arrangement for stability. A second bridge configuration is a connection in which the power supply 24 and the detector 22 are interchanged with reference to the arrangement shown in FIG. 1. If the bridge resistors 18 and 18A have a value of about 10 times the resistance of the sensor windings; for example 14 and 14A are 100 ohms, 18 and 18A will be 1000 ohms and resistor 20 is 20 ohms, in which case the bridge shunt resistance is 55 ohms and a resistance change in 14 of 2 ohms causes a change of total bridge resistance of only 0.5 ohms or 0.1% of the nominal value. Thus, the current through the bridge stays relatively constant and power supply 24 need only be a constant voltage source. A disadvantage, however, is that resistors 18 and 18A dissipate ten times more power than the dissipation of sensing resistors 14 and 14A which is an undesirable situation. A third bridge configuration is the configuration shown in FIG. 1. With the same resistance values mentioned above, the total shunt resistance of the bridge is 182 ohms in this example. With the same current through 14 and 14A, one third less power is dissipated than in the second bridge configuration; however, power supply 24 must be a constant current source. In the third bridge configuration, as shown in FIG. 1, a resistance change of 2 ohms in resistor 14 is reflected as a change of about 2 ohms in the shunt resistance of the bridge, which is 1% of the nominal value. A closely regulated constant current power supply is practical to construct so that the third bridge configuration, as shown in FIG. 1, is preferred.

Figure 2:
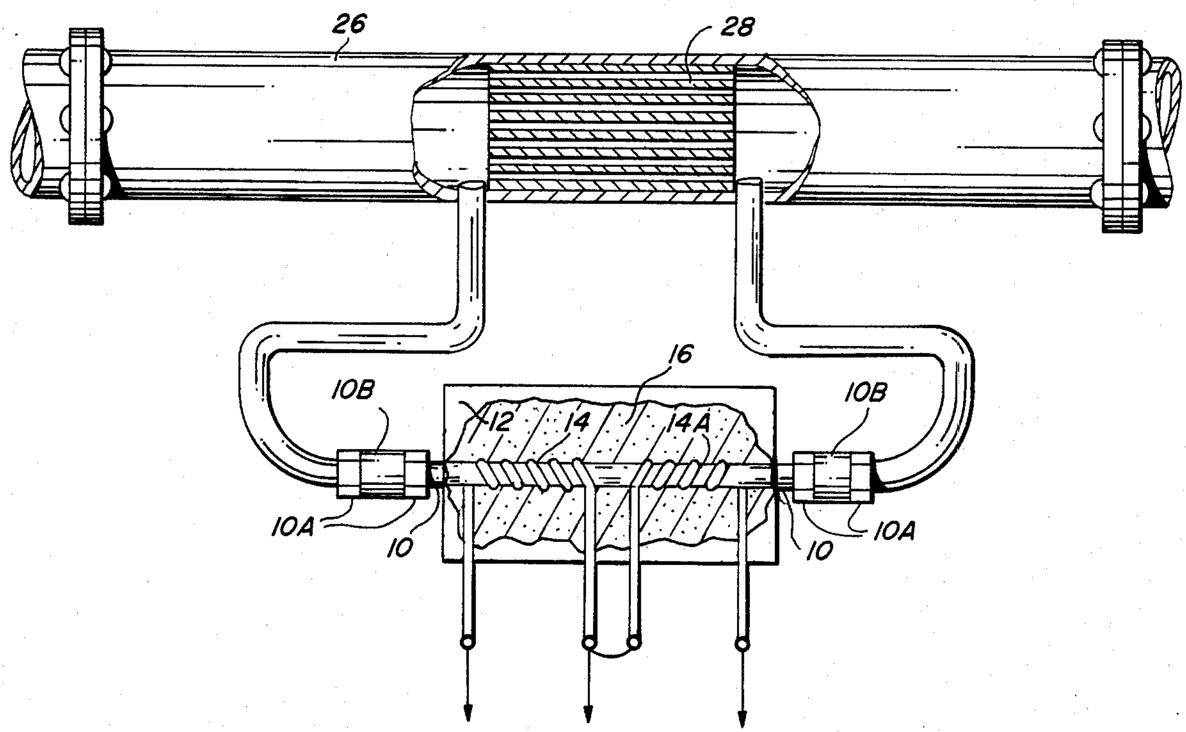
FIG. 2 is a drawing showing the improved flow meter of this invention with the sensor tube portion of FIG. 1 as it is installed in a bypass circuit attached to a large flow line which is partially cut away to show installation of a flow restrictor and flow straightener element.

FIG. 2 shows the flow meter described in FIG. 1 located in a bypass circuit associated with a large flow line 28. Numbers 10 to 16 show the flow meter described in FIG. 1. Direction of fluid flow is the same as is shown in FIG. 1. Elements 10B, not shown in FIG. 1 are non-metallic (i.e. plastic) close or short nipples which facilitate installation of the flow meter and are important because they serve to reduce heat transfer by conduction from the sensor tube 10 to and from the input/output flow lines. Reference numeral 28 shown in the cutaway part of the main flow line 26 functions primarily as a flow reducer or restrictor to assist in diverting flow into the bypass circuit containing the flow meter. Flow reducer 28 is usually constructed of a sheet metal strip which is corrugated, placed on a flat strip of similar size and rolled into a tight bundle which fits into the flow pipe 26. The corrugations may be of triangular, square or semi-circular cross-section, the size of which dictates the cross-section of the flow passages when rolled up and may be selected to assure that flow through the bypass circuit will permit the flow meter to operate over the desired range. The flow reducer 28 which, similar to capillary tubes, is a series of conduits long in proportion to its cross-sectional area and function as flow straighteners thereby converting turbulent flow to laminar flow inside the restrictor 28 in the line or pipe 26.

OPERATION

In summary, the basis of operation of the flow meter is self-heating of the sensor tube 10 by means of the energy supplied by the power supply 24 and the resistors 14 and 14A. The upstream resistor 14 is cooled more than the downstream resistor 14A under flow conditions. Flow sensitivity and scale factor can be adjusted by varying the output of the power supply 24 and the resistance of the flow reducer 28.

The bridge may be balanced with zero flow through the system by adjustment of the resistor 20 or the output can be offset by a predetermined amount with flow to be measured moving the output value through zero to a desired amount in a direction of opposite polarity. It would also be possible, if desired, to operate the flow meter with the offset at a setting fairly remote from zero.

While the invention has been described with respect to a preferred physical embodiment, it will be understood by those skilled in the art that various modifications and improvements may be made without departing from the scope and spirit of the invention which is limited only by the appended claims.

What is claimed is:

1. An improved flow meter comprising, in combination, sensor tube means for permitted flow of a fluid to be measured to be passed therethrough; fluid flow sensing means having electrical sensing resistance means operatively wound around said sensing tube to form two resistive sensing coils at adjacent locations disposed along said sensor tube means for determining the fluid flow characteristics of a fluid flowing therein; the improvement comprising:

non-woven, polyester fiber insulation tape means wrapped tightly around said sensor tube means and said two resistance sensing coils for improved thermal insulation, for significantly reducing external thermal heat loss, for more securely holding said two resistive sensing coils against the outer surface of said sensor tube means, for greater physical strength, for preventing convection of air proximate said two resistive sensing coils thereby eliminating attitude sensitivity, for improved isolation from the surrounding temperature ambient, and for increasing the sensitivity of said electrical sensing resistance means; and metallic thermal shield means having a high thermal conductivity and operably disposed concentrically around said insulation tape means for providing a homogeneous temperature distribution at the outer surface of said insulation tape means and in proximate contact with said non-woven polyester fiber insulation tape means for providing a homogeneous temperature distribution at the outer surface of said insulation tape means for substantially eliminating disturbances caused by radiation and conduction which can effect the accuracy of the sensor output in a non-symmetrical manner, said non-woven, polyester fiber insulation tape means further including solid plastic microspheres dispersed throughout said non-woven polyester fiber insulation for increasing thermal isolation from the surrounding temperature ambient and between adjacent resistive sensing coil windings, for increasing the strength and flexural support thereof, and for further lowering the thermal conductivity of said insulation tape means.

2. The improved flow meter of claim 1 wherein said electrical sensing resistance means including said two resistive sensing coils operatively disposed at spaced apart adjacent locations and operatively wound around said sensor tube means said improved flow meter further including electrical cement-like insulation means which hardens when applied to said two resistive sensing coils and the outer surface of said sensor tube means for securely attaching said two resistive sensing coils in intimate contact with the outer surface of said sensor tube means for improved thermal contact and sensitivity.

3. The improved flow meter of claim 1 wherein said metallic shield is made of a highly heat conductive metal selected from the group consisting of copper, aluminum, and any other metal and alloy that has a thermal conductivity comparable with copper and aluminum.

4. The improved flow meter of claim 1 wherein said sensor means includes a sensor tube, a sensor tube inlet, a sensor tube outlet, said two resistive sensor coils being wound around said sensor tube adjacent to one another, a first thermal isolation means operatively disposed in said sensor tube intermediate said sensor tube inlet and said one of said two resistive sensing coils and a second thermal insulation means operatively disposed in said sensing tube intermediate said sensing tube outlet and the other of said two resistive sensing coils, said thermal isolation means for thermally isolating the flow meter sensor tube from the tubes connected thereto for increased accuracy and the like.

5. The improved flow meter of claim 4 wherein each one of said thermal insulation means including a thermal isolation plastic nipple having a very low thermal conductivity.

6. The improved flow meter of claim 5 including a thin layer of thermal conducting glue-like compound means operatively disposed in the spaces formed between said sensor tube means and said pair of spaced apart resistance elements for penetrating the spaces between said resistive elements and the outer surface of said sensor tube means for rigidly securing said spaced apart resistive elements to the outer surface of said center tube means for obtaining improved thermal contact with the walls of said center tube means and for substantially avoiding thermal lag.

7. The improved flow meter of claim 1 further including a main fluid-conducting pipe, said center tube means including a center tube inlet, a center tube outlet, means operably disposed within said main pipe for converting a turbulent flow therein into a smooth laminar flow; said sensor tube inlet being operatively disposed upstream of said laminar flow means and said sensor tube outlet being operatively disposed downstream of said laminar flow means, said inlet and outlet being operatively disposed immediately adjacent opposite ends of said flow converting means.

8. In a flow meter for measuring the mass flow rate of a fluid through a sensor tube by using the technique of measuring the difference in sensor tube temperature before and after applying a known amount of heat thereto since the flow quantity and speed of flow is proportional to the temperature difference that is measured at two spaced apart positions on the outside portion of the sensor tube by resistive sensing means including first and second resistive sensory coil portions operatively disposed along said sensor tube and wound about said sensor tube through which the fluid is flowing and in proximate contact therewith, one of said sensory resistive coil portions being upstream of the other and each being part of an electrical bridge network means for generating an electrical output indicative of the mass flow rate, the improvement comprising in combination:

thermal conducting adherring compound means for penetrating the spaces between adjacent windings of said resistive coil portions and coating said resistive coil portions and the outside walls of said sensor tube proximate thereto for curing to cement the resistive coil windings securely in place upon the outside surface of the sensor tube for obtaining improved thermal contact between the outside walls of the sensor tube and said resistive coil windings, and for avoiding thermal lag;

non-woven polyester fiber insulation means completely coating said resistive coil windings for reducing undesired external sensor heat tube loss from radiation, for greater temperature insulation, for increasing thermal isolation from surrounding temperature ambient, for increasing the sensitivity of the electrical bridge means, for adding physical strength for holding the resistive coil windings securely about the outer surface of the sensor tube, and for preventing convection of the air around the resistive sensor coils thereby avoiding attitude sensitivity; and a generally cylindrical thermal shield means formed concentrically completely around said non-woven polyester fiber insulation means and the sensor tube covered thereby and in intimate contact therewith for providing an effective means to keep the outer surface of the non-woven polyester fiber insulation means at a thermal homogeneous temperature condition, for substantially eliminating external temperature disturbances caused by radiation and conduction, for having increased thermal conductivity, and for having a substantially homogeneous temperature distribution throughout the dimension of the thermal shield for increased sensor stability, said non-woven polyester fiber insulation means further including solid plastic microspheres operatively disposed throughout for increasing the thermal isolation from the surrounding temperature ambient, for increasing the ability of the insulation means to be disposed between individual windings of said resistive sensor coils, for increasing strength and flexual support, and for lowering the thermal conductivity of said insulation means.

9. The improved flow meter of claim 8 wherein said thermal conducting adherring compound means includes a solution of shellack dissolved in ethanol.

10. The improved flow meter of claim 8 wherein said sensor tube includes non-metal coupling means operatively disposed upstream and downstream from said first and second resistive sensory coils for thermally isolating that portion of the sensing tube including said first and second resistive coils wound thereon from connecting tubing and the like.

11. The improved flow meter of claim 8 wherein said non-woven polyester fiber insulation means including said intersperced solid plastic microspheres are operably disposed on tape, said tape being wound around said sensor tube and said resistive coil windings for insulating same.

12. The improved flow meter of claim 1 wherein said thermal shield means includes at least one high thermal conductivity metal of aluminum and copper.

13. The improved flow meter of claim 1 wherein said sensor tube includes first and second plastic nipples operatively disposed upstream and downstream from said resistive coil windings for thermally isolating same from other system tubes, pipes and the like.

14. The improved flow meter of claim 1 wherein said system includes a main pipe, a sensor tube, inlet means operatively connecting the main pipe to the input of the sensor tube, outlet means operatively coupling the output of the sensor tube to the main pipe, means operably disposed proximate the interior of the main pipe for converting a turbulent fluid flow into a smooth laminar flow, said input and output means being disposed immediately adjacent to the input and output.

15. The improved flow meter of claim 8 wherein said electrical bridge network means for generating a reading proportional to the mass flow rate further includes:

the first sensory resistance coil R1 comprising the first leg of a bridge circuit;

the second sensory resistor coil R2 being wound about the downstream portion of the sensor coil means comprising a second leg of the bridge circuit;

one end of the first sensory resistance coil being connected to one end of a third bridge resistor R3;

one end of the second sensory resistance coil being connected to one end of the fourth resistance coil R4;

potentiometer means operatively coupling the opposite terminals of the third and fourth bridge resistors;

means for operatively coupling the second ends of the first and second sensory resistance coils through a bridge balance-indicating means to the variable tap of the potentiometer resistor coupling the third and fourth bridge resistors; and a constant current source operatively coupling the R2/R4 junction to the R1/R3 junction of the bridge such that much less power is dissipated and greater accuracy is attained.

16. The improved flow meter of claim 15 wherein said bridge network means further includes the first and second sensor resistor coils R1 and R2 are equal; the third and fourth bridge resistors are R3 and R4 are equal and each has a value of approximately ten times the resistance of R1; and the shunt resistance of the bridge is such that a change in the value of R1 of 2 ohmg is reflected as a change of about 2 ohms in the shunt resistance of the bridge which is about one percent of the nominal value.

17. A method for measuring the mass flow rate in a main pipe, tube, or the like by measuring temperature changes in the flow through a sensor tube comprising the steps of:

inserting a flow straightener into the main pipe;

converting a turbulent flow at the input of the flow straightener to a laminar flow at the output of the straightener;

inserting one end of a sensor tube into the main pipe proximate the upstream end of the straightener device;

inserting the opposite end of the sensor tube into the main pipe proximate the downstream end of the straightener device;

thermally isolating a central section of the sensor tube by inserting therein plastic thermal separators;

winding a first electrical resistance coil about the upstream central portion of the sensor tube;

winding a second electrical resistance coil about the outer downstream central portion of the sensor tube;

coating the intermediate sensor tube and the first and second resistance coils wrapped thereon with a hardening compound;

impregnating a tape with a non-woven polyester fiber insulating material containing an admixture of plastic microspheres;

wrapping the impregnated thermal insulating tape about the electrical resistive coils and the outer surface of the intermediate portion of the sensing tube proximate thereto;

placing a metallic shield having a high thermal conductivity and large heat capacity around the thermally insulating tape and in proximate contact therewith;

connecting the first and second electrical resistive coils in a bridge network;

supplying constant current to the bridge network;

heating the first and second electrical resistive coils with power from the constant current source;

cooling one of the first upstream electrical resistor coil and the second downstream electrical resistance coil more that the other by the fluid flowing in the sensor tube;

balancing the bridge; and reading an electrical output signal which is a function of the mass flow rate in the main pipe.

* * * * *